United States Patent [19]  
Sugita et al.

[11] Patent Number: 4,658,463  
[45] Date of Patent: Apr. 21, 1987

[54] WIPER BLADE

[75] Inventors: Hiroshi Sugita, Ichinomiya; Takemasa Yasukawa, Inazawa; Masanori Aritake, Nishikasugai, all of Japan

[73] Assignee: Toyoda Gosei Co., Ltd., Nishikasugai, Japan

[21] Appl. No.: 786,866

[22] Filed: Oct. 11, 1985

[30] Foreign Application Priority Data

Oct. 11, 1984 [JP] Japan ............... 59-153495[U]

[51] Int. Cl.[4] ............................................. B60S 1/38
[52] U.S. Cl. ............................ 15/250.36; 15/250.42
[58] Field of Search ...................... 15/250.36–250.42

[56] References Cited

U.S. PATENT DOCUMENTS

| 3,082,464 | 3/1963 | Smithers | 15/250.42 |
| 3,320,628 | 5/1967 | Bacher et al. | 15/250.42 X |
| 3,418,679 | 12/1968 | Barth et al. | 15/250.36 |
| 3,930,279 | 1/1976 | Arman | 15/250.36 |

FOREIGN PATENT DOCUMENTS

| 1942345 | 3/1971 | Fed. Rep. of Germany | 15/250.36 |
| 1952855 | 4/1971 | Fed. Rep. of Germany | 15/250.36 |
| 3011632 | 10/1981 | Fed. Rep. of Germany | 15/250.42 |
| 374823 | 12/1930 | United Kingdom | 15/250.36 |

Primary Examiner—Peter Feldman  
Attorney, Agent, or Firm—Cushman, Darby & Cushman

[57] ABSTRACT

A wiper blade capable of preventing a harsh metallic noise which is made by the direct impact of a metallic backing plate associated therewith on a blade holder. Rubber flanges are formed integrally with the body of the wiper blade so as to extend upward from the upper surface of the body. The flanges cover at least the longitudinal side edges of the metallic backing plate placed on the upper surface of the body so that the longitudinal side edges of the backing plate will not impact directly on the blade holder.

9 Claims, 4 Drawing Figures

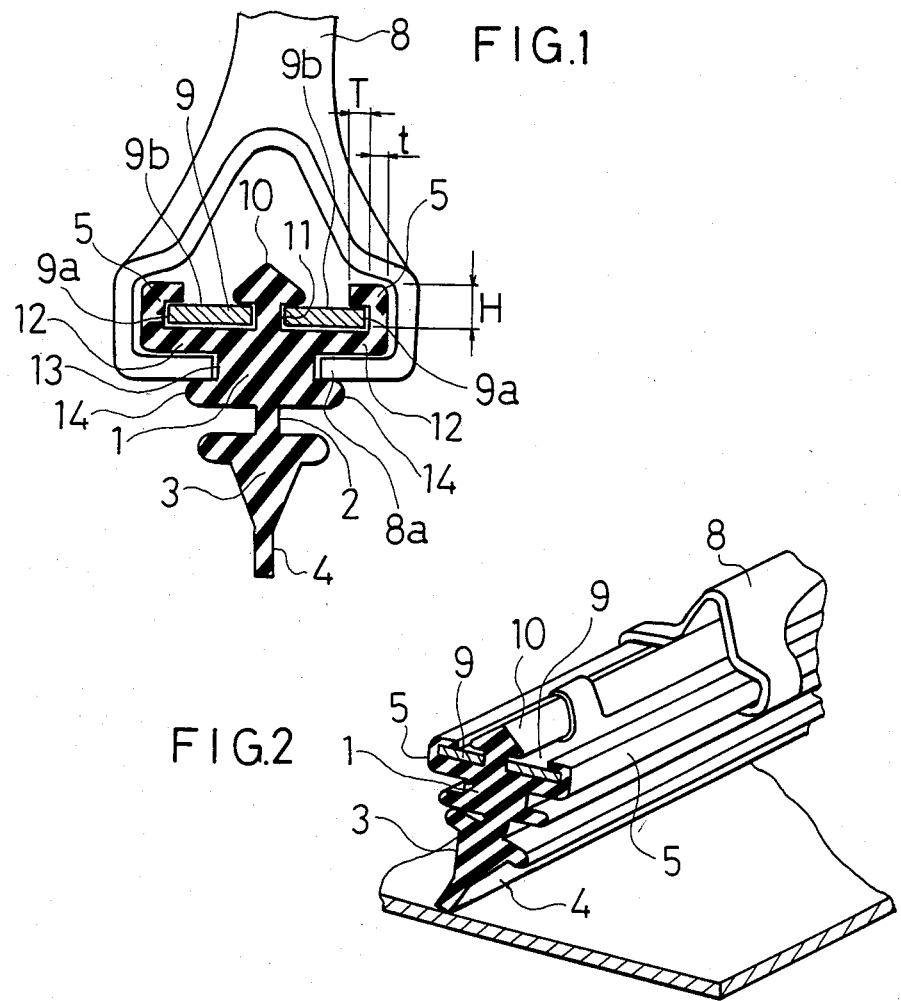
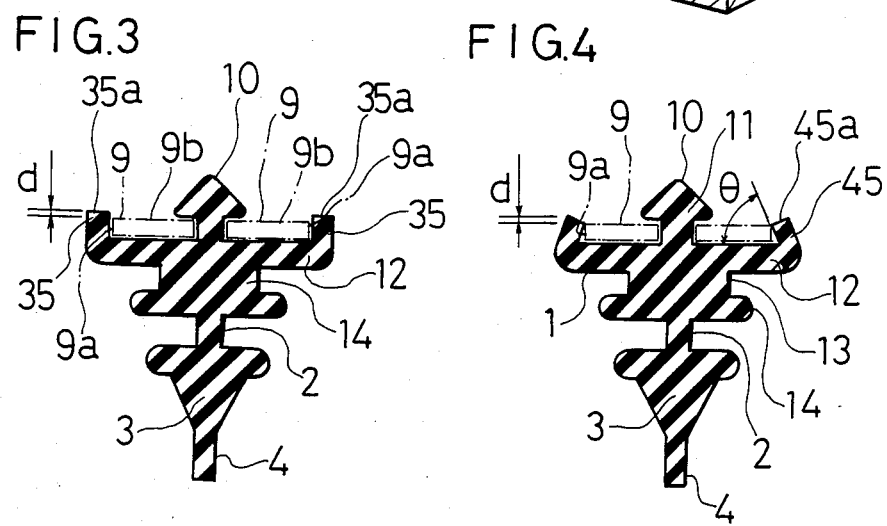

WIPER BLADE

BACKGROUND OF THE INVENTION

1. Field of the Invention

The present invention relates to a wiper blade for automobiles and industrial vehicles. The wiper blade slides along the surface of a glass plate or the like to wipe water drops and the like off the surface of the glass plate or the like.

2. Description of the Prior Art:

Generally, an automotive wiper blade is a rubber strip comprising a thick base section having wings, a turning section having a substantially triangular cross section, a neck section interconnecting the base section and the turning section, and a thin lip section extending from the turning section in the form of a thin plate.

In fitting a wiper blade into a blade holder of an automobile, it is a general practice to fit the wings of the base section with a backing plate to secure the longitudinal rigidity of the base section and to fit the base section into the blade holder of the automobile.

When the wiper blade is fitted into the blade holder of the automobile in such a conventional manner, part of the backing plate is exposed and the exposed part of the backing plate is adjacent to the blade holder. Accordingly, when the wiper is operated, part of the exposed part, namely, the side edges, of the backing plate is apt to hit on the blade holder and generate noises as the turning section turns in opposite directions alternately on the neck section.

Particularly, when the backing plate and the blade holder are made of a metal, unpleasant noises, namely, click-clack noises, are generated as they hit on each other.

Recently, silence in the vehicle's passenger compartment has become a great concern and it is eagerly desired to solve the above-mentioned problem.

SUMMARY OF THE INVENTION

Accordingly, the present invention has been made to solve the above-mentioned problem of the conventional wiper blade.

It is an object of the present invention to provide a wiper blade comprising: a base secntion having wings on which a backing plate is placed and adapted to be joined to a blade holder with the backing plate exposed to the balde holder; a neck section extending from the lower side of the base section; a turning section having a substantially triangular cross section and connected through the neck section to the base section; and a lip section extending from the turning section in the form of a thin plate, wherein flanges are formed along the side edges of the wings, respectively, so as to cover up at least the side edges of the backing plate when the same is placed on the upper surface of the wings.

The term "base section" denotes a thick part which is inserted into the blade holder. The base section may be formed in a solid body typically of natural rubber or a synthetic rubber such as polychloroprene rubber, EPDM (Ethylene-propylene-dieneterpolymer) or the like. These rubbers may be used individually or in a mixture. The solid rubber body may contain, in addition to a rubber material, carbon black, vulcanizing agent, a filler and other components. The base section has wings for holding a backing plate. The sectional shape of the base section is decided selectively taking into consideration the type of the rubber forming the wiper blade.

For example, as shown in FIG. 1, the base section may have a symmetrical cross section and consists of, from the top downward, a head, a neck having a width smaller than that of the head, first wings extending in opposite directions, respectively, beyond the neck, a body having a width smaller than the distance between the longitudinal side edges of the first wings, and second wings extending in opposite directions, respectively, beyond the body. The neck section extends from the lower sides of the base section.

The turning section has a substantially triangular cross section and is connected through the neck section to the base section. Ordinarily, the neck section is joined to the turning section at the central part of one side of the turning section having a triangular cross section. The turning section turns in opposite directions alternately as the wiper blade is reciprocated along the surface of a glass plate. The turning section turns about the root of the neck section rightward and leftward alternately relative to the base section.

The lip section is a thin plate-shaped section projecting from the ridge of the turning section having a substantially triangular cross section. The lip section slides along the surface of the glass plate to wipe the same. The construction of the lip section may be the same as that of the lip section of a conventional wiper blade.

In mounting a wiper blade on a blade holder, a backing plate is held on the upper surfaces of the wings of the base section to secure the longitudinal rigidity of the wiper blade, and then the base section is inserted into the blade holder with part of the backing plate exposed and disposed opposite the blade holder.

The constitution of the essential part of the constitution of the present invention will be described hereinafter. The base section has flanges extending upward from the side edges of the wings. When the backing plate is placed on the wings, the flanges cover up the side edges of the backing plate. Usually, the term "side edges" denotes only the londitudinal side surfaces of the backing plate, however, the term may denote herein the londitudinal side surfaces and portions of the upper surface adjacent to the londitudinal side surfaces. Accordingly, the flanges may be formed so as to cover portions of the upper surface of the backing plate in addition to the side surfaces. When some portions of the upper surface of the backing plate are required to be covered in addition to the side surfaces, the flanges are extended upward from the side edges of the wings in the form of upright walls, and then the upper edges of the upright walls are bent inward.

The flanges may be formed of the same rubber as that forming the base section or of a different rubber. Preferably, each flange is formed of a soft rubber in a porous body. The porous body may be a foam plastic body or a foam rubber body, more specifically, a foam urethane body or a foam EPDM body.

The flanges may be extended from the upper suraces of the wings perpendicularly to the same upper surfaces, respectively, as illustrated in FIG. 3. The flanges may be extended from the side edges of the upper surfaces of the wings at an acute angle to the upper surfaces so as to incline inward, respectively, as illustrated in FIG. 4.

Ordinarily, the wiper blade of the present invention is manufactured through the extrusion molding process, in which an unvulcanized rubber is extruded by a multicolor extrusion molding machine (a two-color or a three-color extrusion molding machine) to form an elongate strip having a predetermined cross section. Ordinarily, this elongate strip has a cross section corresponding to that of two wiper blades joined symmetrically together along the edges of the lip sections thereof. The elongate strip is vulcanized at a vulcanizing temperature, and then the vulcanized strip is cut along the center of the central portion forming the lip sections to divide the strip into two wiper blades. A conventional multicolor extrusion molding process may be allied to forming a wiper blade of the present invention.

In operation, the turning section of the wiper blade turns on the root of the neck section as the lip section wipes the surface of a glass plate or the like. The wiper blade of the present invention has rubber flanges formed integrally with the base section so as to extend upward, and hence at least the side edges of the backing plate placed on the wings are covered with the flanges. Accordingly, the side edges of the backing plate are unable to hit directly on the balde holder. Therefore, unpleasent noises generated by the wiper blade hitting on the blade holder are mitigated or suppressed.

The above and other objects, features and advantages of the present invention will become more apparent from the following description of preferred embodiment thereof taken in conjunction with the accompanying drawings.

BRIEF DESCRIPTION OF THE DRAWINGS

FIG. 1 is a sectional view of a wiper blade, in a first embodiment, according to the present invention as mounted on a blade holder;

FIG. 2 is a perspective view of the essential portion of the wiper blade of FIG. 1 as mounted on a blade holder;

FIG. 3 is a sectional view of a wiper blade, in a second embodiment, according to the present invention; and FIG. 4 is a sectional view of a wiper blade, in a third embodiment according to the present invention.

DESCRIPTION OF THE PREFERRED EMBODIMENTS

Referring to FIGS. 1 and 2 showing a first embodiment of the present invention, the wiper blade comprises a base section 1 having a concave cross section, a neck section 2, a turning section 3 having a substantially triangular cross section and a lip section extending from the ridge of the turning section 3. The base section has a symmetrical cross section and consists of, from the top downward, a head 10, a neck 11 having a width smaller than that of the head 10, first wings 12 extending in opposite directions, respectively, beyond the neck, a body 13 having a width smaller than the distance between the longitudinal side edges of the wings 12, and second wings 14 extending in opposite directions, respectively, beyond the body 13. Flanges 5, which feature the present invention, extend upward from the longitudinal side edges of the upper surfaces of the first wings 12 of the base section 1, respectively. The respective upper ends of the flanges 5 are directed inward as shown in FIG. 1. Incidentally, the height H of each flange 5 from the upper surface of the wings 12 is about 2 mm, while the width T of the inwardly directed portion of the flange 5 is about 1 mm, and the thickness t of each flange 5 is about 1 mm. The overall height of the wiper blade, namely, the distance between the edge of the lip section 4 and the edge of the head 10, is approximately 12 mm, the distance between the side edges of the first wings 12, namely, the overall width of the wiper blade, is approximately 9 mm, and the thickness of the lip section 4 is about 0.8 mm. This wiper blade is manufactured through extrusion molding.

FIG. 1 shows the wiper blade in the first embodiment as mounted on a wiper holder 8. In this state, a backing plate 9 is inserted between the lower surface of the head 10 and the upper surfaces of the first wings 12 with part of the upper surface 9b of the backing plate 9 exposed. The longitudinal side edges 8a of the blade holder 8 are received in grooves between the first wings 12 and the second wings 14.

The wiper blade and the backing plate can be removed from the blade holder 8 by longitudinally sliding the wiper blade relative to the blade holder 8. The backing plate 9 can be separated from the wiper blade by longitudinally sliding the backing plate 9 relative to the wiper blade. Thus the wiper blade is moved longitudinally relative to the blade holder in replacing an old one with a new one.

The action and effect of this embodiment will be described hereunder. When the wiper is operated, the turning section 3 turns in opposite directions alternately on the root of the neck section 2 to wipe the surface of a glass plate with the lip section 4. Since the side edges 9a of the backing plate 9 are covered with the rubber flanges 5 extending upward from the first wings 12 of the base section 1 and portions of the upper surface 9b of the backing plate 9 in the vicinity of the side edges 9a are covered with the inwardly directed portions of the flanges 5, the direct impact of the side edges 9a of the backing plate 9 on the blade holder 8 is prevented during the operation of the wiper. Naturally, the direct impact of the upper surface 9b of the backing plate on the blade holder 8 also is prevented. Therefore, even if the blade holder 8 and the backing plate 9 are metallic members, generation of a harsh metallic sound, namely, click-clack noises, is obviated.

If obviation of generation of such click-clack noises is the only purpose, it is possible to form a combination of a wiper blade and a backing plate through insert molding to bury the backing plate within the base section so that the backing plate is covered entirely with the wiper blade. However, if the wiper blade and the backing plate are combined in such a manner, it is practically impossible to separate the backing plate from the wiper blade in order to replace the wiper blade with a new one. According to the present invention, the wiper blade can be removed from the blade holder 8 by longitudinally moving the wiper blade relative to the blade holder 8 and the backing plate 9 can be separated from the wiper blade by longitudinally moving the backing plate 9 relative to the wiper blade. Accordingly, when the neck section 2 or the lip section 4 of the wiper blade of the present invention is damaged or deteriorated, the wiper blade is removed from the blade holder 8 and the backing plate 9 and a new wiper blade is joined to the wiper holder 8 and the backing plate 9.

FIG. 3 shows a second embodiment of the present invention. In the second embodiment, flanges 35 extend perpendicularly to the upper surface of first wings 12 so as to cover the side edges 9a of a backing plate 9. The upper ends 35a of the flanges 35 project above the upper surface 9b of the backing plate 9 by a distance d. Ordinarily, the distance d is about 0.2 to 0.5 mm. The second embodiment also is capable of preventing click-clack noises which are generated by the impact of the metallic backing plate 9 on a metallic blade holder 8. In the second embodiment, since the upper ends 35a of the flanges 35 project by a distance d above the upper surface 9b of the backing plate 9, the impact of the upper surface 9b of the backing plate 9 on the blade holder 8 is obviated, though the upper ends thereof are not directed inward as the flanges 5 of the first embodiment.

FIG. 4 shows a third embodiment of the present invention. In the third embodiment, flanges 45 extend from the outer edges of the upper surfaces of first wings 12 so as to project above the upper surface 9b of a backing plate 9 by a distance d and so that the upper ends thereof approach each other. Ordinarily, the inclination of the flanges 45 is an angle in the range of 60 to 90. When the flanges 45 are thus inclined, the flanges 45 are able to hold the backing plate 9 at the side edges 9a. Accordingly, the backing plate 9 is held firmly so that the backing plate 9 will not rattle.

What is claimed is:

1. A wiper blade, comprising:
   a base section having a symmetrical transverse cross-sectional shape and comprising, from the top downward, a head, a neck having a width smaller than that of said head, a pair of first wings together having a width larger than that of said neck and extending in opposite lateral directions beyond said head to respective side edges, a body having a width smaller than the distance between said side edges of said first wings and extending to opposite side edges, and a pair of second wings extending in opposite lateral directions beyond said side edges of said body;
   a neck portion extending downwards from medially of said pair of second wings of said base section;
   a medially disposed turning portion connected to said base section through said neck portion and extending downwards therefrom, said turning portion having approximately triangular transverse cross-sectional shape, apex end downwards;
   a medially disposed lip portion extending downwards from the apex end of said turning section in the form of a laterally thin strip;
   a backing plate member comprising a pair of laterally-spaced plate-like elastic portions having laterally outer side edges and laterally inner side edges, and a connecting portion which arches over and connects said pair of elastic portions with one another so as to provide a gap of predetermined lateral dimension between said laterally inner side edges of said elastic portions;
   said backing plate member being longitudinally slidngly detachably assembled to said base section so that said neck of said base section is disposed laterally between said laterally inner side edges of said elastic portions and said connecting portion arches over and around said head and said elastic portions are intervened vertically between respective downwardly facing shoulders provided on said head of said base section, and respective upwardly facing shoulders provided on said first wings, inwardly of said opposite side edges of said first wings;
   said first wings of said base section having respective upwardly directed flanges provided thereon, said flanges being integral with said base section and extending upwardly laterally outwardly of said laterally outer side edges of said elastic portions throughout the height of said laterally outer edges of said elastic portions so as to substantially protect said laterally outer side edges of said elastic portions from lateral engagement by a wiper blade holder structure;
   said base section, said neck portion, said turning portion and said lip portion being made of natural or synthetic rubber.

2. The wiper blade of claim 1, wherein:
   said flanges extend upwardly beyond said laterally outer side edges of said elastic portions.

3. The wiper blade of claim 2, wherein:
   said flanges are inclined upwardly towards one another.

4. The wiper blade of claim 2, wherein:
   said flanges are inverted L-shaped with respective upper horizontal legs directed medially towards one another.

5. The wiper blade of claim 2, wherein:
   said flanges are perpendicular to said upwardly facing shoulders of said first wings and terminate in upper ends disposed laterally outwardly of respective of said laterally outer edges of said elastic portions.

6. The wiper blade of claim 2, wherein:
   said flanges are made of natural or synthetic rubber integral with said first wings.

7. The wiper blade of claim 2, wherein:
   said flanges are made of foamed rubber.

8. The wiper blade of claim 2, wherein:
   said flanges are made of foamed plastic material.

9. The wiper blade of claim 2, wherein:
   said backing plate member is made of metal.

* * * * *